United States Patent
Wang et al.

(10) Patent No.: US 11,196,529 B2
(45) Date of Patent: Dec. 7, 2021

(54) INDICATION METHOD, PROCESSING METHOD, AND APPARATUS

(71) Applicant: HUAWEI TECHNOLOGIES CO., LTD., Guangdong (CN)

(72) Inventors: Yafei Wang, Shanghai (CN); Chi Zhang, Shanghai (CN); Ming Wu, Shenzhen (CN); Xiaojun Ma, Shanghai (CN); Junchao Li, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 113 days.

(21) Appl. No.: 16/567,543

(22) Filed: Sep. 11, 2019

(65) Prior Publication Data
US 2020/0007300 A1     Jan. 2, 2020

Related U.S. Application Data (63) Continuation of application No. PCT/CN2018/091344, filed on Jun. 14, 2018.

(30) Foreign Application Priority Data

Jun. 16, 2017 (CN) .......................... 201710459500.5

(51) Int. Cl.
| | |
|---|---|
| H04L 5/00 | (2006.01) |
| H04W 72/04 | (2009.01) |
| H04W 76/11 | (2018.01) |

(52) U.S. Cl.
CPC .......... *H04L 5/0092* (2013.01); *H04L 5/0094* (2013.01); *H04W 72/042* (2013.01); *H04W 72/0453* (2013.01); *H04W 76/11* (2018.02)

(58) Field of Classification Search
None
See application file for complete search history.

(56) References Cited

U.S. PATENT DOCUMENTS

| | | | |
|---|---|---|---|
| 2016/0128030 A1 | 5/2016 | Tiirola et al. | |
| 2016/0192355 A1 | 6/2016 | Yu et al. | |
| (Continued) | | | |

FOREIGN PATENT DOCUMENTS

| | | |
|---|---|---|
| CN | 104348602 A | 2/2015 |
| CN | 105099634 A | 11/2015 |
| (Continued) | | |

OTHER PUBLICATIONS

Huawei et al.,"On bandwidth partand bandwidth adaptation",3GPPTSGRANWG1 Meeting #89 R1-1706900, Hangzhou, China, May 15-19, 2017,total 9 pages.

(Continued)

*Primary Examiner* — Saba Tsegaye
(74) *Attorney, Agent, or Firm* — Womble Bond Dickinson (US) LLP (57) ABSTRACT

A method includes: configuring, by a network device, M BPs for at least one terminal device, where the M BPs are located on one frequency domain resource; determining, by the network device, first indication information related to X BPs in the M BPs, where the first indication information includes at least one field, each field is used to indicate transmission types in at least one time unit on the X BPs; sending, by the network device, the first indication information to the at least one terminal device, where the at least one terminal device includes a first terminal device; and sending, by the network device, second indication information to the first terminal device, where the second indication information is used to indicate an index relationship between that at least one of N BPs configured for the first terminal device and the at least one field in the first indication information.

14 Claims, 6 Drawing Sheets

(56) References Cited

U.S. PATENT DOCUMENTS

| | | | |
|---|---|---|---|
| 2017/0135105 A1 | 5/2017 | Li et al. | |
| 2018/0199343 A1* | 7/2018 | Deogun | H04L 5/0094 |
| 2019/0268903 A1* | 8/2019 | Lee | H04W 72/0446 |
| 2019/0320450 A1 | 10/2019 | Li et al. | |
| 2019/0394754 A1* | 12/2019 | Islam | H04L 5/0044 |
| 2020/0015261 A1* | 1/2020 | Takeda | H04W 72/0446 |

FOREIGN PATENT DOCUMENTS

| | | |
|---|---|---|
| CN | 105324954 A | 2/2016 |
| CN | 105979597 A | 9/2016 |
| EP | 3585089 A1 | 12/2019 |

OTHER PUBLICATIONS

Intel Corporation,"Group-common PDCCH:Contents",3GPP TSG RAN WG1 #89 R1-1707385,Hangzhou, P.R. China, May 15-19, 2017,total 4 pages.

Huawei et al.,"Contents of group-common PDCCH",3GPP TSG RAN WG1 Meeting #89 R1-1708146,Hangzhou, China, May 15-19, 2017,total 4 pages.

\* cited by examiner

INDICATION METHOD, PROCESSING METHOD, AND APPARATUS

CROSS-REFERENCE TO RELATED APPLICATIONS

This application is a continuation of International Application No. PCT/CN2018/091344, filed on Jun. 14, 2018, which claims priority to Chinese Patent Application No. 201710459500.5, filed on Jun. 16, 2017. The disclosures of the aforementioned applications are hereby incorporated by reference in their entireties.

TECHNICAL FIELD

This application relates to the field of information technologies, and in particular, to an indication method, a processing method, and an apparatus.

BACKGROUND

A future 5th generation mobile communications system (5G) supports a flexible slot format. In one slot: all symbols may be used for uplink transmission; all symbols may be used for downlink transmission; some symbols may be used for uplink transmission; or some symbols may be used for downlink transmission.

In a 5G new radio (NR) system under discussion, a maximum bandwidth of one carrier may reach 400 MHz. However, a maximum bandwidth capability that a terminal device supports cannot reach such a large bandwidth. When the terminal device does not support a bandwidth capability of a carrier, a base station cannot directly allocate a resource to the terminal device in a range of a carrier bandwidth as a long term evolution (LTE) system does. Instead, the base station first indicates, within a carrier, a bandwidth part (BP) to the terminal device, and then allocates a resource to the terminal device in a range of the BP. In addition, each BP corresponds to a subcarrier spacing, and different subcarrier spacings may correspond to different slot formats. When a network side configures a plurality of BPs for the terminal device, how to indicate a slot format of a slot on each BP to the terminal device is an urgent problem to be resolved.

SUMMARY

This disclosure provides an indication method, a processing method, and an apparatus, to resolve a problem of how to indicate, to a terminal device, a slot format of a slot on each BP configured for the terminal device.

An embodiment of this disclosure provides an indication method, and the method includes:

configuring, by a network device, M BPs for at least one terminal device, where the M BPs are located on one frequency domain resource, and M is an integer greater than or equal to 1;

determining, by the network device, first indication information related to X BPs in the M BPs, where the first indication information includes at least one field, each field is used to indicate transmission types in at least one time unit on the X BPs, and X is a positive integer less than or equal to M;

sending, by the network device, the first indication information to the at least one terminal device, where the at least one terminal device includes a first terminal device; and sending, by the network device, second indication information to the first terminal device, where the second indication information is used to indicate an index relationship between at least one of N BPs configured for the first terminal device and the at least one field in the first indication information, and N is a positive integer less than or equal to X.

In one embodiment, subcarrier spacings of the X BPs are the same, the X BPs include at least two BPs, transmission types in the at least one time unit on the at least two BPs are different, and at least two fields included in the first indication information are used to indicate the transmission types in the at least one time unit on the at least two BPs;

the sending, by the network device, the first indication information to the first terminal device includes:

adding, by the network device, the first indication information to a group common physical downlink control channel (PDCCH) sent on a common BP in the M BPs, and transmitting the group common PDCCH to the first terminal device.

In one embodiment, subcarrier spacings of the X BPs are the same, the X BPs include at least two BPs, transmission types in the at least one time unit on the at least two BPs are different, and the first indication information includes at least two pieces of indication information used to indicate the transmission types in the at least one time unit on the at least two BPs; and the sending, by the network device, the first indication information to the first terminal device includes:

adding, by the network device, the at least two pieces of indication information to a group common PDCCH sent on the at least two BPs, and transmitting the group common PDCCH to the first terminal device.

In one embodiment, each field in the first indication information includes a same quantity of bits, and each of the X BPs corresponds to at least one field in the first indication information; and the determining, by the network device, first indication information related to X BPs in the M BPs includes:

determining, by the network device based on a subcarrier spacing of each of the X BPs, a quantity of fields that are in the first indication information and that correspond to each BP, and determining, based on a transmission type in each time unit on each of the X BPs, a value of the field corresponding to the BP.

In one embodiment, the first indication information includes a plurality of fields having different quantities of bits, and each of the X BPs corresponds to one field in the first indication information; and the determining, by the network device, first indication information related to the M BPs includes:

determining, by the network device based on a subcarrier spacing of each of the X BPs, a quantity of bits of a field that is in the first indication information and that corresponds to the BP, and determining, based on a transmission type in each time unit on each of the X BPs, a value of the field corresponding to the BP.

In one embodiment, the first indication information is scrambled by using a radio network temporary identifier (RNTI), and the RNTI is a group common RNTI of the terminal device.

One embodiment provides a processing method, and the method includes:

receiving, by a first terminal device, first indication information from a network device, where the first indication information includes at least one field used to indicate transmission types in at least one time unit on N BPs, the N BPs are N BPs in Q BPs configured by the network device for the first terminal device, the Q BPs are located on one frequency domain resource, Q is an integer greater than or equal to 1, and N is a positive integer less than or equal to Q;

receiving, by the first terminal device, second indication information from the network device, where the second indication information is used to indicate an index relationship between at least one of the N BPs and the at least one field in the first indication information; and determining, by the first terminal device based on the index relationship and the first indication information, a field corresponding to at least one of the N BPs, and determining the transmission types in the at least one time unit on the at least one BP based on the determined field.

In one embodiment, the receiving, by a first terminal device, first indication information from a network device includes:

receiving, by the first terminal device, the first indication information carried on a group common PDCCH that is transmitted by the network device on a common BP, where subcarrier spacings of the N BPs are the same, the N BPs include at least two BPs, transmission types in at least one time unit on the at least two BPs are different, and at least two fields included in the first indication information are used to indicate the transmission types in the at least one time unit on the at least two BPs.

In one embodiment, each field in the first indication information includes a same quantity of bits, and each of the N BPs corresponds to at least one field in the first indication information; and a quantity of fields that are in the first indication information and that correspond to each of the N BPs is determined by the network device based on a subcarrier spacing of the BP.

In one embodiment, the first indication information includes fields having different quantities of fields, and each of the N BPs corresponds to one field in the first indication information; and a quantity of bits of a field that is in the first indication information and that corresponds to each of the N BPs is determined by the network device based on a subcarrier spacing of the BP.

In one embodiment, the first indication information is scrambled by using an RNTI, and the RNTI is a group common RNTI of the terminal device.

One embodiment provides a network device, including a processing unit and a sending unit, where the processing unit is configured to: configure M BPs for at least one terminal device, where the M BPs are located on one frequency domain resource, and M is an integer greater than or equal to 1; and determine first indication information related to X BPs in the M BPs, where the first indication information includes at least one field, each field is used to indicate transmission types in at least one time unit on the X BPs, and X is a positive integer less than or equal to M; and the sending unit is configured to: send the first indication information to the at least one terminal device, where the at least one terminal device includes a first terminal device; and send second indication information to the first terminal device, where the second indication information is used to indicate an index relationship between at least one of N BPs configured for the first terminal device and the at least one field in the first indication information, and N is a positive integer less than or equal to X.

In one embodiment, subcarrier spacings of the X BPs are the same, the X BPs include at least two BPs, transmission types in the at least one time unit on the at least two BPs are different, and at least two fields included in the first indication information are used to indicate the transmission types in the at least one time unit on the at least two BPs; and the sending unit is configured to send the first indication information to the first terminal device includes:

the sending unit is configured to add the first indication information to a group common PDCCH sent on a common BP in the M BPs, and transmit the group common PDCCH to the first terminal device.

In one embodiment, subcarrier spacings of the X BPs are the same, the X BPs include at least two BPs, transmission types in the at least one time unit on the at least two BPs are different, and the first indication information includes at least two pieces of indication information used to indicate the transmission types in the at least one time unit on the at least two BPs; and the sending unit is configured to send the first indication information to the first terminal device includes:

the sending unit is configured to: add the at least two pieces of indication information to a group common PDCCH sent on the at least two BPs, and transmit the group common PDCCH to the first terminal device.

In one embodiment, each field in the first indication information includes a same quantity of bits, and each of the X BPs corresponds to at least one field in the first indication information; and processing unit is configured to determine first indication information related to X BPs in the M BPs includes:

the processing unit is configured to: determine, based on a subcarrier spacing of each of the X BPs, a quantity of fields that are in the first indication information and that correspond to each BP, and determine, based on a transmission type in each time unit on each of the X BPs, a value of the field corresponding to the BP.

One embodiment provides a terminal device, including a receiving unit and a processing unit, where the receiving unit is configured to: receive first indication information from a network device, where the first indication information includes at least one field used to indicate transmission types in at least one time unit on N BPs, the N BPs are N BPs in Q BPs configured by the network device for the first terminal device, the Q BPs are located on one frequency domain resource, Q is an integer greater than or equal to 1, and N is a positive integer less than or equal to Q; and receive second indication information from the network device, where the second indication information is used to indicate an index relationship between at least one of the N BPs and the at least one field in the first indication information; and the processing unit is configured to: determine, based on the index relationship and the first indication information, a field corresponding to at least one of the N BPs, and determine the transmission types in the at least one time unit on the at least one BP based on the determined field.

In one embodiment, the receiving unit is configured to receive first indication information from a network device includes:

the receiving unit is configured to receive the first indication information carried on a group common PDCCH that is transmitted by the network device on a common BP, where subcarrier spacings of the N BPs are the same, the N BPs include at least two BPs, transmission types in at least one time unit on the at least two BPs are different, and at least two fields included in the first indication information are used to indicate the transmission types in the at least one time unit on the at least two BPs.

In one embodiment, each field in the first indication information includes a same quantity of bits, and each of the N BPs corresponds to at least one field in the first indication information; and a quantity of fields that are in the first indication information and that correspond to each of the N BPs is determined by the network device based on a subcarrier spacing of the BP.

In one embodiment, the first indication information includes fields having different quantities of fields, and each of the N BPs corresponds to one field in the first indication information; and a quantity of bits of a field that is in the first indication information and that corresponds to each of the N BPs is determined by the network device based on a subcarrier spacing of the BP.

In one embodiment, the first indication information is scrambled by using an RNTI, and the RNTI is a group common RNTI of the terminal device.

One embodiment provides a processing method, and the method includes:

receiving, by a terminal device, at least two pieces of indication information carried on a group common PDCCH that is transmitted by a network device on at least two BPs, where each piece of indication information includes a field, and each field is used to indicate transmission types in at least one time unit on the at least two BPs; and determining, by the terminal device based on the at least two pieces of indication information, fields corresponding to the at least two BPs configured for the terminal device, and determining the transmission types in the at least one time unit on the at least two BPs based on the determined field.

In one embodiment, the M BPs are divided into at least one group of BPs, subcarrier spacings of BPs in each group are the same, and transmission types in Y time units on the BPs in each group are the same, where Y is a positive integer, and indication information indicating the transmission types in the at least one time unit on the BPs in each group is sent through a group common PDCCH; and the X BPs belong to a same group of BPs.

One embodiment provides a terminal device, including a receiving unit and a processing unit, where the receiving unit is configured to receive at least two pieces of indication information carried on a group common PDCCH that is transmitted by a network device on at least two BPs, where each piece of indication information includes a field, and each field is used to indicate transmission types in at least one time unit on the at least two BPs; and the processing unit is configured to determine, based on the at least two pieces of indication information, fields corresponding to the at least two BPs configured for the terminal device, and determine the transmission types in the at least one time unit on the at least two BPs based on the determined field.

An embodiment of this disclosure provides a computer storage medium, the computer storage medium stores an instruction, and the instruction, when run on a computer, enables the computer to perform the method according to any possible embodiment described above.

An embodiment of this disclosure further provides a communications system, and the system includes the network device or the terminal device provided in any embodiment described above. In one embodiment, the system may further include another device that communicates with the network device or the terminal device according to the solution provided in this embodiment.

An embodiment of this disclosure further provides a computer program product including an instruction, and the instruction, when run on a computer, enables a computer is enabled to perform the method in the foregoing aspects.

DESCRIPTION OF EMBODIMENTS

The following further describes this disclosure in detail with reference to accompanying drawings.

The technical solutions in embodiments of this disclosure may be applied to various communications systems, for example, a fifth-generation mobile communications system (5G), wireless fidelity (wifi), a long term evolution (LTE) system, an advanced LTE (LTE-A) system, and a cellular system related to the 3rd generation partnership project (3GPP). It is considered that the 5G system includes a new radio (NR) system.

As described above, a method and an apparatus provided in the embodiments of this disclosure may be applied to the 5G system. For example, network elements in 5G are described as follows:

A network device may be a gNB (gNodeB), an ordinary base station, a NR controller, a centralized unit, a radio frequency remote module, a micro base station, a distributed unit, a transmission reception point (TRP), a transmission point (TP), or any other radio access device. However, the embodiments of this disclosure are not limited thereto.

Terminal device: A terminal device is a device that accesses a network side in 5G by using network devices such as a gNB or a TRP, and may also be referred to as user equipment (UE). The terminal device is a device that provides voice and/or data connectivity to a user, for example, a handheld device and an in-vehicle device that has a wireless connection function. Common terminals include, for example, a mobile phone, a tablet computer, a notebook computer, a palmtop computer, a mobile Internet device (MID), and a wearable device, such as a smart watch, a smart band, or a pedometer.

A time unit may be a slot, a mini slot, a system frame, or a subframe. One time unit may include a plurality of symbols. For example, in an NR system, one slot may support seven symbols or 14 symbols, and a mini slot may support one or more symbols.

Figure 1:
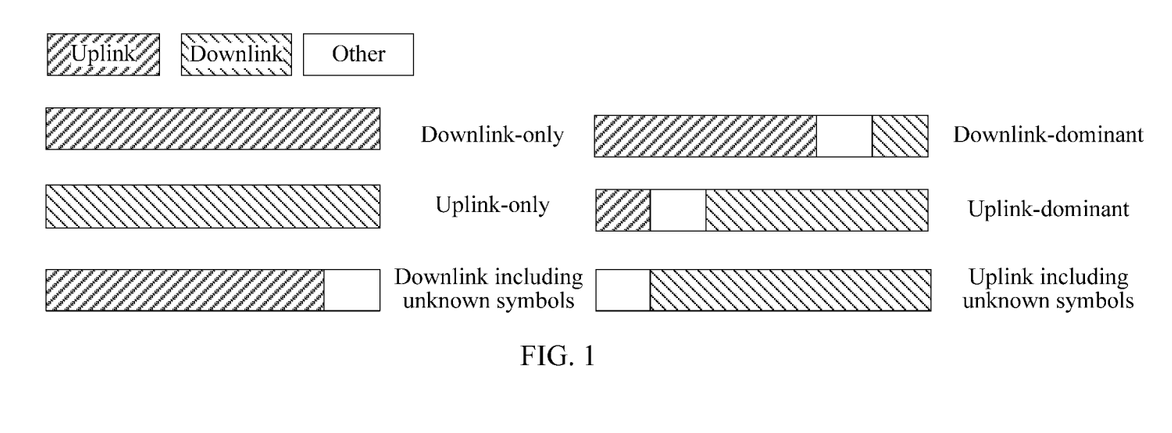
FIG. 1 is a schematic diagram of a transmission type in a time unit according to an embodiment of this disclosure.

Currently, in 5G under discussion, a time unit may have a plurality of transmission types based on transmission directions in symbols included in the time unit. Transmission directions in symbols in one time unit may be uplink, downlink, or other types, and the other types are unknown and empty. When the other type is unknown, symbols may be reversed symbols. Various combinations of symbols in different transmission directions form different transmission types. For example, FIG. 1 is a schematic diagram of a transmission type in a time unit according to an embodiment of this disclosure. FIG. 1 includes an uplink-only time unit, a downlink-only time unit, an uplink-dominant time unit, a downlink-dominant time unit, an uplink time unit including unknown symbols, and a downlink time unit including unknown symbols. Each symbol in the uplink-only time unit is an uplink symbol, each symbol in the downlink-only time unit is a downlink symbol, the uplink-dominant time unit includes many uplink symbols, a few downlink symbols, and a few other symbols, and the downlink-dominant time unit includes many downlink symbols, a few uplink symbols, and a few other symbols.

It should be noted that, the transmission type may also be referred to as a format of a time unit. For example, when the time unit is a slot, the transmission type may be referred to as a slot format, a slot structure, or the like.

Certainly, only examples are described above, the transmission type in a time unit may have other forms, which are not described herein one by one.

The method and the apparatus provided in the embodiments of this disclosure may be applicable to a wireless communications system. One carrier in the system includes N BPs, a BP corresponds to a plurality of time units in time domain, and one of the time units may correspond to a transmission type. In other words, transmission types corresponding to a plurality of time units corresponding to one BP may be totally the same, partially the same, or totally different. Alternatively, a band in the system includes N component carriers (CCs), and each BP/CC corresponds to one transmission type in a time unit, where N is an integer greater than 1. In the following description, an example in which one carrier in the system includes N BPs is used for description. When one bandwidth in the system includes N CCs, a network device indicates a transmission type that is in at least one time unit and that corresponds to each CC.

In this embodiment of this disclosure, a BP may be a segment of continuous resources in a frequency domain. For example, a bandwidth part includes K>0 continuous subcarriers; or a bandwidth part is a frequency domain resource on which N>0 non-overlapping continuous resource blocks (RBs) are located; or a bandwidth part is a frequency domain resource on which M>0 non-overlapping continuous resource block groups (RBGs) are located. One RBG includes P>0 continuous RBs. A bandwidth part is related to a particular system parameter set, and the system parameter set includes at least one of a subcarrier spacing and a cyclic prefix (CP).

Figure 2:
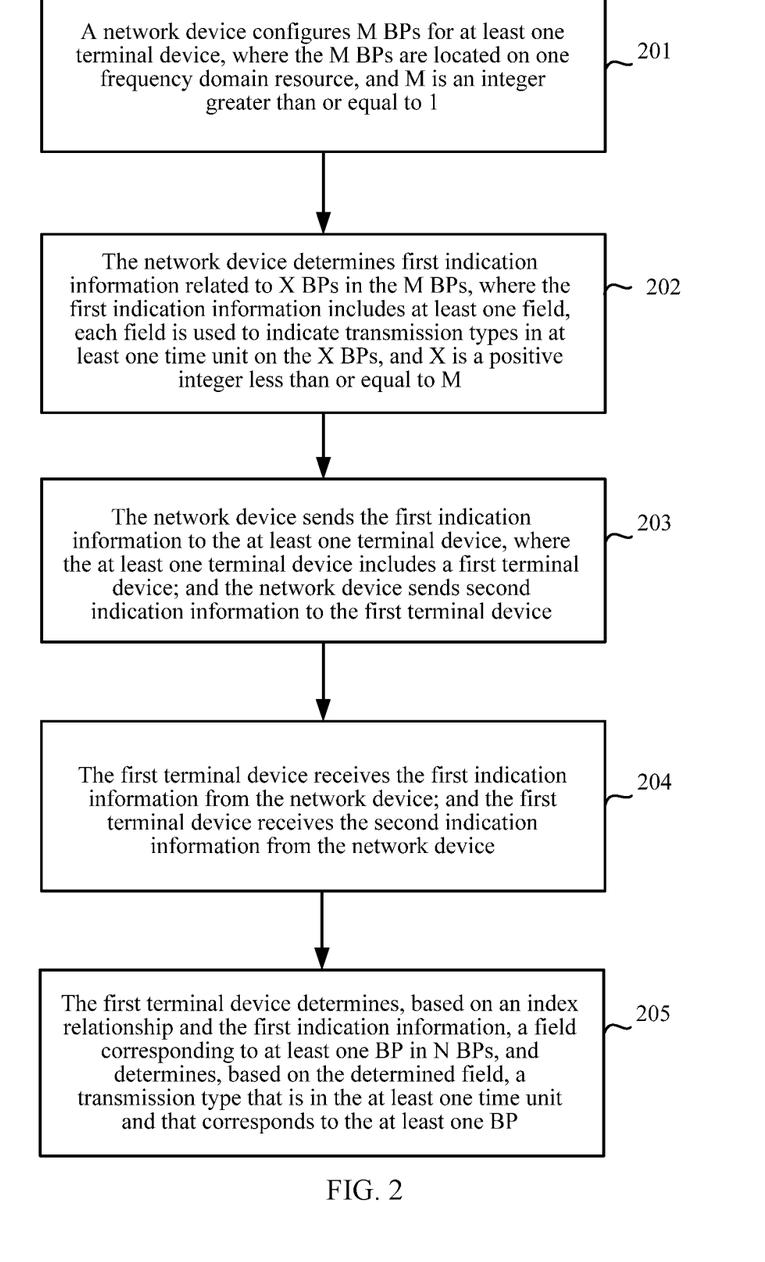
FIG. 2 is a schematic flowchart of an indication method according to an embodiment of this disclosure.

FIG. 2 is a schematic flowchart of an indication method according to an embodiment of this disclosure. The method includes the following operations.

Operation 201: A network device configures M BPs for at least one terminal device, where the M BPs are located on one frequency domain resource, and M is an integer greater than or equal to 1.

Operation 202: The network device determines first indication information related to X BPs in the M BPs, where the first indication information includes at least one field, each field is used to indicate transmission types in at least one time unit on the X BPs, and X is a positive integer less than or equal to M.

A quantity of BPs configured for the network device is M, X is a quantity of BPs that are in the M BPs and that are activated, and X may be equal to M. In this case, the M BPs configured are all activated.

It should be noted that, the first indication information may be scrambled by using an RNTI, and the RNTI is a group common RNTI of the terminal device.

Operation 203: The network device sends the first indication information to the at least one terminal device, where the at least one terminal device includes a first terminal device; and the network device sends second indication information to the first terminal device.

The second indication information is used to indicate an index relationship between at least one of N BPs configured for the first terminal device and the at least one field in the first indication information, and N is a positive integer less than or equal to X.

A sending sequence of the first indication information and the second indication information is not limited in this embodiment of this disclosure.

Operation 204: The first terminal device receives the first indication information from the network device; and the first terminal device receives the second indication information from the network device.

The at least one field included in the first indication information is used to indicate a transmission type in at least one time unit on N BPs, the N BPs are N BPs in Q BPs configured by the network device for the first terminal device, the Q BPs are located on one frequency domain resource, Q is an integer greater than or equal to 1, and N is a positive integer less than or equal to Q.

Q is a quantity of BPs configured by the network device for the first terminal, and N is a quantity of BPs activated by the network device for the first terminal.

Operation 205: The first terminal device determines, based on an index relationship and the first indication information, a field corresponding to at least one BP in N BPs, and determines, based on the determined field, a transmission type that is in the at least one time unit and that corresponds to the at least one BP.

A receiving sequence of the first indication information and the second indication information is not limited in this embodiment of this disclosure.

Different scenarios are described below with reference to the foregoing operations.

In a first possible scenario, the network device configures or activates at least one BP/CC for the terminal device, each BP/CC has a same subcarrier spacing, time units on each BP/CC may have different transmission types, and transmission types in time units on BPs/CCs that have a same frequency domain resource and that are configured by different terminal devices may be different. For example, for dynamic time division duplex (TDD), total radiated power (TRP) cross link interference and terminal device-terminal device cross link interference exist. Measurement of cross interference needs to occupy a particular amount of time frequency resources, and this part of measurement resources (example, time domain) may be indicated by using other types of symbols in a time unit. That is, on different BPs, measurement resources may be different.

In this scenario, each field in the first indication information may include a same quantity of bits, subcarrier spacings of the X BPs are the same, the X BPs include at least two BPs, and the transmission types in the at least one time unit on the at least two BPs are different. At least two fields included in the first indication information are used to indicate the transmission types in the at least one time unit on the at least two BPs.

In this case, in operation 202, the network device may determine, based on the subcarrier spacing of each of the X BPs, a quantity of fields that are in the first indication information and that correspond to the BP.

For example, if determining that the subcarrier spacings of the X BPs are the same, the network device may determine that the quantity of fields that are in the first indication information and that correspond to each of the X BPs is 1.

The network device may determine, based on a transmission type in each time unit on each of the X BPs, a value of a field correspond to each BP. For example, each transmission type corresponds to a value, a time unit whose transmission type is downlink-only corresponds to 000, a time unit whose transmission type is uplink-only corresponds to 001, and a time unit whose transmission type is downlink-dominant corresponds to 100. When a transmission type that is in a time unit and that corresponds to a BP is an uplink-only time unit, the network device may determine that a value of a field corresponding to the BP is 001.

Figure 3:
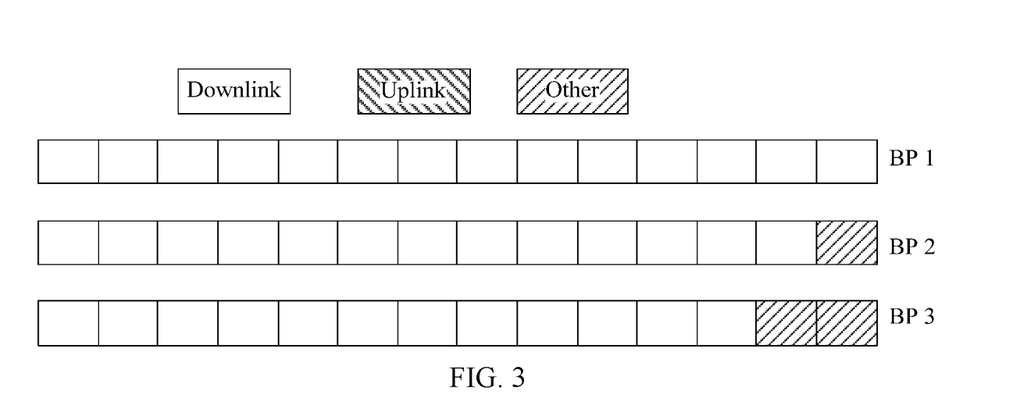
FIG. 3 is a schematic diagram of a transmission type in a time unit according to an embodiment of this disclosure.

For example, subcarrier spacings of a BP 1, a BP 2, a BP 3 are all 15 kHz, and the BP 1, the BP 2, and the BP 3 correspond to different transmission types in a time unit (e.g., for details, refer to FIG. 3). It should be noted that, numbers that correspond to time units having different transmission types are described as an example below, and numbers may have other forms.

Figure 4:
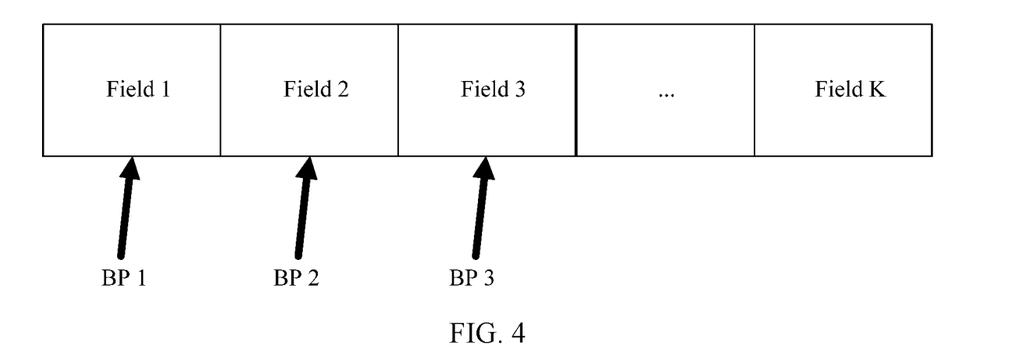
FIG. 4 is a schematic diagram of a transmission type in a time unit according to an embodiment of this disclosure.

All symbols in time units on the BP 1 are downlink symbols, and a time unit having this transmission type corresponds to 001; the last symbol in time units on the BP 2 is a symbol of another type, all other symbols are downlink symbols, and a time unit having this transmission type corresponds to 010; the last two symbols in time units on the BP 3 are symbols of another type, all other symbols are downlink symbols, and a time unit having this transmission type corresponds to 100. When configuring the BP 1, the BP 2, and the BP 3 for the terminal device, the network device may determine that a value of a field that corresponds to the BP 1 and that is in the first indication information is 001, a value of a field that corresponds to the BP 2 and that is in the first indication information is 010, and a value of a field that corresponds to the BP 3 and that is in the first indication information is 100. With reference to the foregoing description, as an example, the first indication information may be shown in FIG. 4. In FIG. 4, the first indication information includes K fields: a field 1, a field 2, a field 3, . . . , and a field K. The field 1, the field 2, and the field 3 correspond to the BP 1, the BP 2, and the BP 3. The field 1 has a value of 001, the field 2 has a value of 010, and the field 3 has a value of 100.

In operation 203, the transmission types in the time units on each BP may be indicated by using different or separate group common PDCCHs.

When the transmission types of the time units on each BP may be indicated by using a separate group common PDCCH, the at least two fields included in the first indication information are used to indicate the transmission types that are in the at least one time unit and that correspond to the at least two BPs. In this case, the network device may add the first indication information to the group common PDCCH sent on a common BP in the M BPs, and transmit the group common PDCCH to the first terminal device. The common BP may be a predefined BP.

When the transmission types of the time units on each BP may be indicated by using different group common PDCCHs, the first indication information includes at least two pieces of indication information used to indicate the transmission types in the at least one time unit on the at least two BPs. In this case, the network device adds the at least two pieces of indication information to a group common PDCCH sent on the at least two BPs, and transmits the group common PDCCH to the first terminal device.

In operation 203, a form of the second indication information is not limited. In one embodiment, the network device may send the second indication information through higher layer signaling.

The higher layer signaling may be a master information block (MIB), a system information block (SIB), radio resource control (RRC) signaling, or other higher layer signaling having a similar feature.

Correspondingly, in operation 204, the first terminal device may receive the first indication information through the group common PDCCH. The first terminal device may descramble DCI in the group common PDCCH by using the RNTI, to obtain the DCI including the first indication information.

In operation 205, the first terminal device may receive the second indication information through the higher layer signaling.

After the first terminal device determines, by using the second indication information, the index relationship between the at least one BP configured for the first terminal device and the at least one field in the first indication information, the first terminal device may determine, based on the index relationship and the first indication information, the field corresponding to the at least one BP configured for the first terminal device. Herein, the determined BP may be at least one BP configured by the network device for the first terminal device in advance, or may be at least one BP that the network device determines to activate.

For example, with reference to FIG. 4, the first terminal device may determine, based on the second indication information, that the BP 1, the BP 2, and the BP 3 configured for the first terminal device correspond to the field 1, the field 2, and the field 3 in the first indication information.

Then, the first terminal device may determine, based on the determined field, the transmission type that is in the at least one time unit and that corresponds to the at least one BP configured for the first terminal device. It should be noted that, the determined field may be to all BPs configured for the first terminal device, or may be to the activated BP in the BPs configured for the first terminal device.

For example, with reference to FIG. 4, the first terminal device determines, based on the values of the field 1, the field 2, and the field 3, the transmission types that are in the at least one time unit and that correspond to the BP 1, the BP 2, and the BP 3.

For a carrier aggregation (CA) scenario in NR, an NR standard discusses support of aggregation of CCs having a same subcarrier spacing or different subcarrier spacings. When a plurality of aggregated CCs have a same subcarrier spacing, transmission types that correspond to time units on the plurality of CCs configured for the first terminal device may also be different. The foregoing solution can also be applied to this scenario.

In a second possible scenario, the network device configures or activates at least one BP/CC for the first terminal device. At least two BPs/CCs have different subcarrier spacings, time units on the different BPs/CCs may have different transmission types, and transmission types in time units and on BPs/CCs that have a same frequency domain resource and that are configured for the first terminal device may be different. For example, the network device configures the BP 1 and the BP 2 for the first terminal device. A subcarrier spacing of the BP1 is 15 kHz, a subcarrier spacing of the BP 2 is 30 kHz, and indication information that indicates transmission types in time units on the BP 1 and the BP 2 are located in a same group common PDCCH. Therefore, the transmission type in one time unit on the BP 1 should be detected, and the transmission types in two time units on the BP 2 should be detected.

In this scenario, fields in the first indication information include a same quantity of bits, each of the M BPs correspond to the at least one field in the first indication information, and in addition, each field indicates a transmission type that is in one time unit and that correspond to one of the M BPs.

In this case, in operation 201, the network device may determine, based on the subcarrier spacing of each of the X BPs, a quantity of fields that are in the first indication information and that correspond to the BP. In an example, the network device may determine a subcarrier spacing of a BP that is in the X BPs and that has a minimum subcarrier spacing, and may determine that a quantity of fields corresponding to the BP that has a minimum subcarrier spacing is 1. A quantity of fields corresponding to any other BP in the X BPs is a multiple between the subcarrier spacing of the BP and the subcarrier spacing of the BP that has a minimum subcarrier spacing. For example, if the subcarrier spacing of the BP that is in the X BPs and that has a minimum subcarrier spacing is 15 kHz, a quantity of fields corresponding to a BP that has a subcarrier spacing of 30 kHz may be 2, and a quantity of fields corresponding to a BP that has a subcarrier spacing of 60 kHz may be 4.

The network device may further determine, based on a transmission type in each time unit on each of the X BPs, a value of a field corresponding to the BP. For example, each transmission type corresponds to a value, a subcarrier spacing of the BP1 is 15 kHz, a subcarrier spacing of the BP 2 is 30 kHz, and transmission types that are in one time unit and that correspond to the BP 1 and the BP 2 are different. Details may be shown in FIG. 5.

Figure 5:
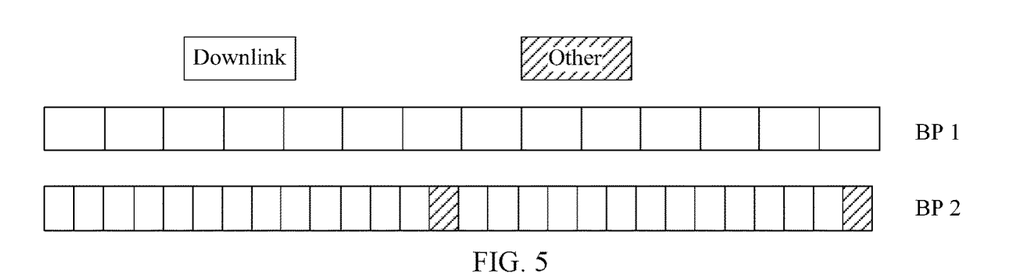
FIG. 5 is a schematic diagram of a transmission type in a time unit according to an embodiment of this disclosure.
Figure 6:
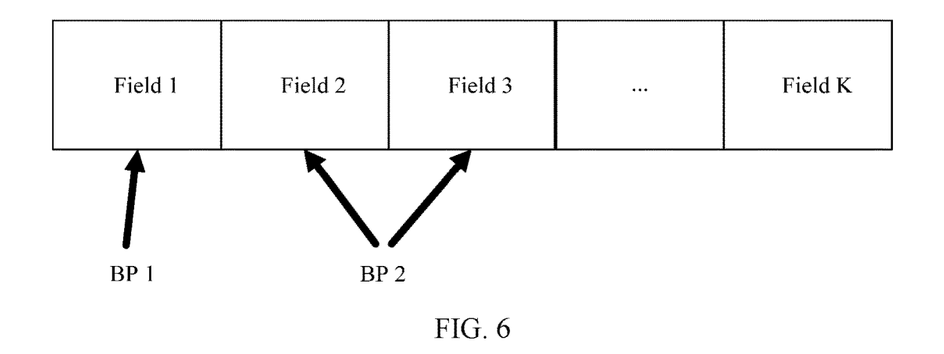
FIG. 6 is a schematic diagram of a transmission type in a time unit according to an embodiment of this disclosure.

All symbols in time units on the BP 1 are downlink symbols, and a time unit having this transmission type corresponds to 001; the last symbol in the first time unit on the BP 2 is a symbol of another type, all other symbols are downlink symbols, and a time unit having this transmission type corresponds to 010; and last symbol in the second time unit on the BP 2 is a symbol of another type, all other symbols are downlink symbols, and a time unit having this transmission type corresponds to 010. When configuring the BP 1 and the BP 2 for the first terminal device, the network device may determine that a value of a field that corresponds to the BP 1 and that is in the first indication information is 001, a value of a field that corresponds to the first time unit on the BP 2 and that is in the first indication information is 010, and a value of a field that corresponds to the second time unit on the BP 2 and that is in the first indication information is 010. With reference to the foregoing description, the first indication information may be shown in FIG. 6. In FIG. 6, the first indication information includes K fields: a field 1, a field 2, a field 3, . . . , and a field K. The field 1 corresponds to the BP 1, the field 2 and the field 3 correspond to the BP 2, and each field indicates a transmission type that is in one time unit and that corresponds to one BP.

In this scenario, for content of operation 202 to operation 205, refer to the description of the first possible scenario.

For a CA scenario in NR, an NR standard discusses support of aggregation of CCs having a same subcarrier spacing or different subcarrier spacings. When a plurality of aggregated CCs have a same subcarrier spacing, transmission types that are in time units and that correspond to the plurality of CCs configured for the first terminal device may also be different. The foregoing solution can also be applied to this scenario.

Figure 7:
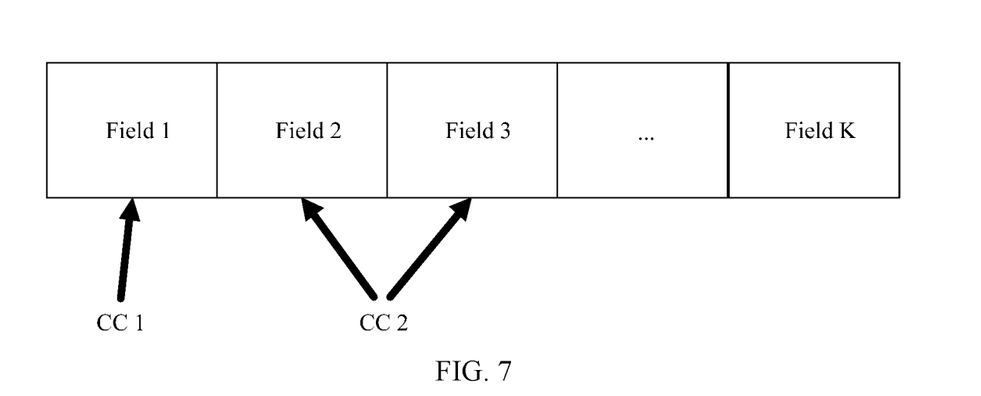
FIG. 7 is a schematic diagram of a transmission type in a time unit according to an embodiment of this disclosure.

For example, the network device notifies, by using the second indication information in delivered higher layer signaling (for example, RRC signaling), the first terminal device of an index of a field corresponding to each CC. For example, as shown in FIG. 7, the first indication information includes K fields: a field 1, a field 2, a field 3, . . . , and a field K. A field that is in the first indication information and that corresponds to a CC 1 is the field 1, a field that is in the first indication information and that corresponds to the first time unit on a CC 2 is the field 2, and a field that is in the first indication information and that corresponds to the second time unit on the CC 2 is the field 3. In this case, when the first terminal device configures the CC 1 and the CC 2 having different subcarrier spacings, the first terminal device determines a transmission type in one or more time units on each CC based on an index relationship, between a field corresponding to each CC and the CC, and indicated by the second indication information.

It should be noted that, in this scenario, the transmission type in the time unit on each BP may be indicated by using different or separate group common PDCCHs.

In the second possible scenario, the first indication information includes a plurality of fields having different quantities of bits, and each of the X BPs corresponds to one field in the first indication information.

In this case, the network device determines, based on the subcarrier spacing of each of the X BPs, a quantity of bits of a field that is in the first indication information and that corresponds to each BP, and determines, based on a transmission type that is in each time unit and that corresponds to each of the X BPs, a value of the field corresponding to the BP.

It should be noted that how the network device determines the quantity of bits of each field is not limited in this embodiment of this disclosure.

Similarly, when a plurality of aggregated CCs have a same subcarrier spacing, transmission types that are in time units and that correspond to the plurality of CCs configured for the first terminal device may also be different. The foregoing solution can also be applied to this scenario.

For example, the network device notifies, by using the second indication information in delivered higher layer signaling (for example, RRC signaling), the first terminal device of an index of a field corresponding to each CC. For example, a field that is in the first indication information and that corresponds to a CC 1 is a slot format indicator 1, and a field that is in the first indication information and that corresponds to two time units on a CC 2 is a slot format indicator 2. In this case, when the first terminal device configures the CC 1 and the CC 2 having different subcarrier spacings, the first terminal device determines a transmission type in one or more time units on each CC based on an index relationship, between a field corresponding to each CC and the CC, and indicated by the second indication information.

In a third possible scenario, the M BPs are divided into at least one group of BPs, subcarrier spacings of BPs in each group are the same, and transmission types in Y time units on the BPs in each group are the same, where Y is a positive integer, and indication information indicating the transmission types that are in the at least one time unit and that correspond to the BPs in each group is sent through a group common PDCCH. In this scenario, the X BPs may belong to one group B.

It should be noted that, X may be preset by a system or notified of by a system. In general cases, the X time units indicate that within a period of time, transmission types in time units on various BPs are the same.

Figure 8:
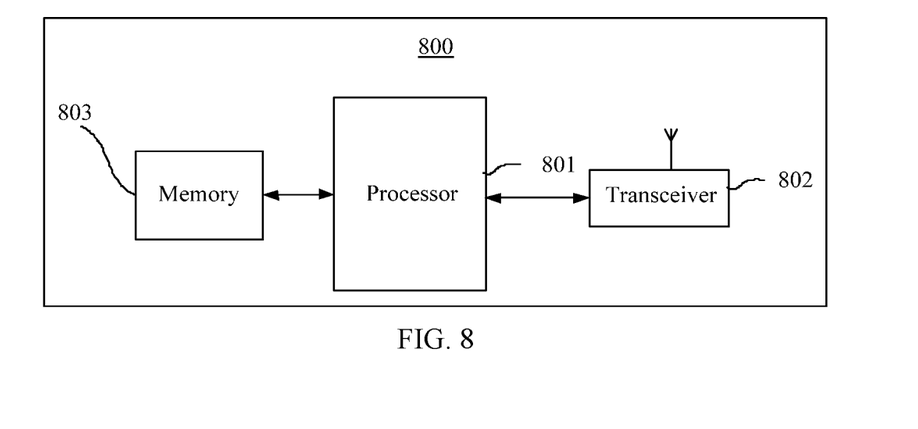
FIG. 8 is a schematic structural diagram of a network device according to an embodiment of this disclosure.

Based on a same technical concept, an embodiment of this disclosure further provides a network device, and the network device can perform the foregoing method embodiment. FIG. 8 is a schematic structural diagram of a network device 800 according to an embodiment of this disclosure. The network device 800 includes: a processor 801 and a transceiver 802.

The processor 801 is configured to configure M BPs for at least one terminal device, where the M BPs are located on one frequency domain resource, and M is an integer greater than or equal to 1.

The processor 801 is configured to determine first indication information related to X BPs in the M BPs, where the first indication information includes at least one field, each field is used to indicate transmission types that are in at least one time unit and that correspond to the X BPs, and X is a positive integer less than or equal to M.

The transceiver 802 is configured to determine first indication information related to X BPs in the M BPs, where the first indication information includes at least one field, each field is used to indicate transmission types in at least one time unit on the X BPs, and X is a positive integer less than or equal to M.

The transceiver 802 is configured to send second indication information to the first terminal device, where the second indication information is used to indicate an index relationship between at least one of N BPs configured for the first terminal device and the at least one field in the first indication information, and N is a positive integer less than or equal to X.

For other content that may be performed by the network device 800, refer to the foregoing description.

The network device 800 may further include a memory 803, and the memory 803 may be configured to store program/code installed in advance before delivery of the network device 800, or may store program code that includes a computer operation instruction and that is executed by the processor 801.

Figure 9:
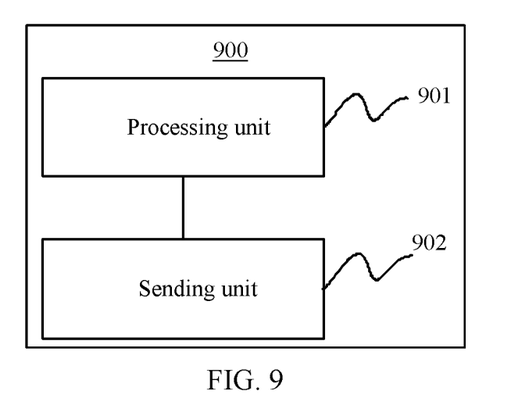
FIG. 9 is a schematic structural diagram of a network device according to an embodiment of this disclosure.

FIG. 9 is a schematic structural diagram of a network device according to an embodiment of this disclosure. The network device may perform the foregoing method embodiment. As shown in FIG. 9, the network device 900 includes: a processing unit 901 and a sending unit 902.

The processing unit 901 is configured to configure M BPs for at least one terminal device, where the M BPs are located on one frequency domain resource, and M is an integer greater than or equal to 1.

The processing unit 901 is configured to determine first indication information related to X BPs in the M BPs, where the first indication information includes at least one field, each field is used to indicate transmission types in at least one time unit on the X BPs, and X is a positive integer less than or equal to M.

The sending unit 902 is configured to send the first indication information to the at least one terminal device, where the at least one terminal device includes a first terminal device.

The sending unit 902 is configured to send second indication information to the first terminal device, where the second indication information is used to indicate an index relationship between at least one of N BPs configured for the first terminal device and the at least one field in the first indication information, and N is a positive integer less than or equal to X.

It should be understood that division of the foregoing units is merely logical function division. In an actual implementation, all or some of units may be integrated into a physical entity, or may be physically separate.

Figure 10:
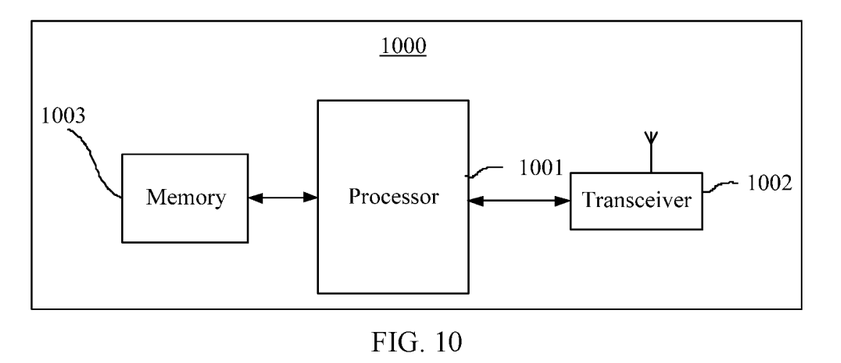
FIG. 10 is a schematic structural diagram of a terminal device according to an embodiment of this disclosure.

Based on a same technical conception, an embodiment of this disclosure further provides a terminal device, and the terminal device may perform the foregoing method embodiment. FIG. 10 is a schematic structural diagram of a terminal device according to an embodiment of this disclosure. The terminal device 1000 includes: a processor 1001 and a transceiver 1002.

The transceiver 1002 is configured to receive first indication information from a network device, where the first indication information includes at least one field used to indicate the transmission types in at least one time unit on N BPs, the N BPs are N BPs in Q BPs configured by the network device for the first terminal device, the Q BPs are located on one frequency domain resource, Q is an integer greater than or equal to 1, and N is a positive integer less than or equal to Q.

The processor 1001 is configured to receive second indication information from the network device by using the transceiver 1002, where the second indication information is used to indicate an index relationship between at least one of the N BPs and the at least one field in the first indication information.

The processor 1001 is configured to: determine, based on the index relationship and the first indication information, a field corresponding to at least one BP in the N BPs, and determine, based on the determined field, the transmission types that are in the at least one time unit and that correspond to the at least one BP.

The terminal device 1000 may further include a memory 1003, and the memory 1003 may be configured to store program/code installed in advance before delivery of the terminal device 1000, or may store program code that includes a computer operation instruction and that is executed by the processor 501.

Figure 11:
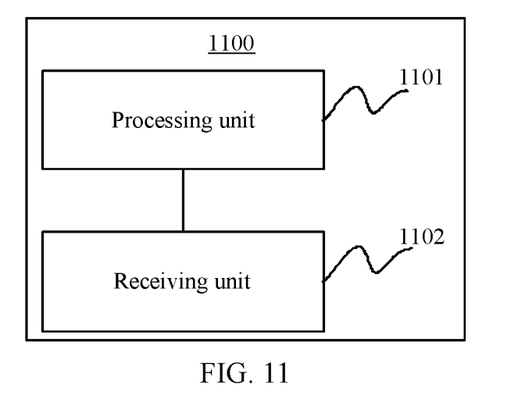
FIG. 11 is a schematic structural diagram of a terminal device according to an embodiment of this disclosure.

FIG. 11 is a schematic structural diagram of a terminal device according to an embodiment of this disclosure. The terminal device may perform the foregoing method embodiment. As shown in FIG. 11, the terminal device 1100 includes: a processing unit 1101 and a receiving unit 1102.

The receiving unit 1102 is configured to receive first indication information from a network device, where the first indication information includes at least one field used to indicate transmission types in at least one time unit on N BPs, the N BPs are N BPs in Q BPs configured by the network device for the first terminal device, the Q BPs are located on one frequency domain resource, Q is an integer greater than or equal to 1, and N is a positive integer less than or equal to Q.

The receiving unit 1102 is configured to receive second indication information from the network device, where the second indication information is used to indicate an index relationship between at least one of the N BPs and the at least one field in the first indication information.

The processing unit 1101 is configured to: determine, based on the index relationship and the first indication information, a field corresponding to at least one BP in the N BPs, and determine, based on the determined field, the transmission types that are in the at least one time unit and that correspond to the at least one BP.

It should be understood that division of the foregoing units is merely logical function division. In an actual implementation, all or some of units may be integrated into a physical entity, or may be physically separate.

An embodiment of this disclosure further provides a processing circuit, the processing circuit may be a chip, and the processing circuit mainly performs the operation performed by the processing unit 1101.

An embodiment of this disclosure further provides a computer-readable storage medium, configured to store a computer software instruction that needs to be executed for execution of the foregoing processor, and the computer-readable storage medium includes a program that needs to be executed for execution of the foregoing processor.

A person skilled in the art should understand that the embodiments of this disclosure may be provided as a method, a system, or a computer program product. Therefore, this disclosure may use a form of hardware only embodiments, software only embodiments, or embodiments with a combination of software and hardware. Moreover, this disclosure may use a form of a computer program product that is implemented on one or more computer-usable storage media (including but not limited to a magnetic disk memory, an optical memory, and the like) that include computer-usable program code.

This disclosure is described with reference to the flowcharts and/or the block diagrams of the method, the device (system), and the computer program product according to this disclosure. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer readable memory that can instruct the computer or any other programmable data processing device to work in any manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or another programmable device provide steps or operations for implementing a function in one or more processes in the flowcharts and/or in one or more blocks in the block diagrams.

A person skilled in the art can make various modifications and variations to this disclosure without departing from the spirit and scope of this disclosure. This disclosure is intended to cover these modifications and variations of this disclosure provided that they fall within the scope defined by the following claims and their equivalent technologies.

What is claimed is:

1. A method comprising:
    receiving, by a first terminal device, first indication information from a network device, wherein the first indication information comprises at least one field used to indicate transmission types in at least one time unit on N bandwidth parts (BPs), the N BPs are N BPs in Q BPs configured by the network device for the first terminal device, the Q BPs are located on one frequency domain resource, Q is an integer greater than or equal to 1, and N is a positive integer less than or equal to Q;
    receiving, by the first terminal device, second indication information from the network device, wherein the second indication information is used to indicate an index relationship between at least one of the N BPs and the at least one field in the first indication information; and
    determining, by the first terminal device based on the index relationship and the first indication information, a field corresponding to at least one of the N BPs, and determining the transmission types in the at least one time unit on the at least one BP based on the determined field.

2. The method according to claim 1, wherein the receiving, by the first terminal device, first indication information from the network device comprises:
    receiving, by the first terminal device, the first indication information carried on a group common physical downlink control channel (PDCCH) that is transmitted by the network device on a common BP, wherein,
    subcarrier spacings of the N BPs are the same, the N BPs comprise at least two BPs, transmission types in at least one time unit on the at least two BPs are different, and at least two fields comprised in the first indication information are used to indicate the transmission types in the at least one time unit on the at least two BPs.

3. The method according to claim 1, wherein each field in the first indication information comprises a same quantity of bits, and each of the N BPs corresponds to at least one field in the first indication information; and
    wherein, a quantity of fields that are in the first indication information and that correspond to each of the N BPs is determined by the network device based on a subcarrier spacing of the BP.

4. The method according to claim 1, wherein the first indication information comprises fields having different quantities of bits, and each of the N BPs corresponds to one field in the first indication information; and
    wherein, a quantity of bits of a field that is in the first indication information and that corresponds to each of the N BPs is determined by the network device based on a subcarrier spacing of the BP.

5. The method according to claim 1, wherein the first indication information is scrambled by using a radio network temporary identifier (RNTI), and the RNTI is a group common RNTI of the first terminal device.

6. A network device comprising:
    a processor configured to: configure M bandwidth parts (BPs) for at least one terminal device, wherein the M BPs are located on one frequency domain resource, and M is an integer greater than or equal to 1; and determine first indication information related to X BPs in the M BPs, wherein the first indication information comprises at least one field, each field being used to indicate transmission types in at least one time unit on the X BPs, and X is a positive integer less than or equal to M; and a transceiver configured to: send the first indication information to the at least one terminal device, wherein the at least one terminal device comprises a first terminal device; and send second indication information to the first terminal device, wherein the second indication information is used to indicate an index relationship between at least one of N BPs configured for the first terminal device and the at least one field in the first indication information, and N is a positive integer less than or equal to X.

7. The network device according to claim 6, wherein, subcarrier spacings of the X BPs are the same, the X BPs comprise at least two BPs, transmission types in the at least one time unit on the at least two BPs are different, and at least two fields comprised in the first indication information are used to indicate the transmission types in the at least one time unit on the at least two BPs; and wherein, the transceiver configured to send the first indication information to the first terminal device comprises:

the transceiver being configured to add the first indication information to a group common physical downlink control channel (PDCCH) sent on a common BP in the M BPs, and transmit the group common PDCCH to the first terminal device.

8. The network device according to claim 6, wherein, subcarrier spacings of the X BPs are the same, the X BPs comprise at least two BPs, transmission types in the at least one time unit on the at least two BPs are different, and the first indication information comprises at least two pieces of indication information used to indicate the transmission types in the at least one time unit on the at least two BPs; and wherein, the transceiver configured to send the first indication information to the first terminal device comprises:

the transceiver being configured to: add the at least two pieces of indication information to a group common PDCCH sent on the at least two BPs, and transmit the group common PDCCH to the first terminal device.

9. The network device according to claim 6, wherein each field in the first indication information comprises a same quantity of bits, and each of the X BPs corresponds to at least one field in the first indication information; and wherein, the processor configured to determine the first indication information related to X BPs in the M BPs comprises:

the processor being configured to: determine, based on a subcarrier spacing of each of the X BPs, a quantity of fields that are in the first indication information and that correspond to each BP, and determine, based on a transmission type in each time unit on each of the X BPs, a value of the field corresponding to the BP.

10. A terminal device comprising:

a transceiver configured to: receive first indication information from a network device, wherein the first indication information comprises at least one field used to indicate transmission types in at least one time unit on N bandwidth parts (BPs), the N BPs are N BPs in Q BPs configured by the network device for the first terminal device, the Q BPs are located on one frequency domain resource, Q being an integer greater than or equal to 1, and N being a positive integer less than or equal to Q; and receive second indication information from the network device, wherein the second indication information is used to indicate an index relationship between at least one of the N BPs and the at least one field in the first indication information; and a processor being configured to: determine, based on the index relationship and the first indication information, a field corresponding to at least one of the N BPs, and determine the transmission types in the at least one time unit on the at least one N BP based on the determined field.

11. The terminal device according to claim 10, wherein, the transceiver is configured to receive the first indication information carried on a group common physical downlink control channel (PDCCH) that is transmitted by the network device on a common BP, wherein, subcarrier spacings of the N BPs are the same, the N BPs comprise at least two BPs, transmission types in at least one time unit on the at least two BPs are different, and at least two fields comprised in the first indication information are used to indicate the transmission types in the at least one time unit on the at least two BPs.

12. The terminal device according to claim 10, wherein, each field in the first indication information comprises a same quantity of bits, and each of the N BPs corresponds to at least one field in the first indication information; and a quantity of fields that are in the first indication information and that correspond to each of the N BPs are determined by the network device based on a subcarrier spacing of the BP.

13. The terminal device according to claim 10, wherein, the first indication information comprises fields having different quantities of bits, and each of the N BPs corresponds to one field in the first indication information; and a quantity of bits of a field that is in the first indication information and that corresponds to each of the N BPs is determined by the network device based on a subcarrier spacing of the BP.

14. The terminal device according to claim 10, wherein, the first indication information is scrambled by using a radio network temporary identifier (RNTI), and the RNTI is a group common RNTI of the terminal device.

* * * * *

UNITED STATES PATENT AND TRADEMARK OFFICE
CERTIFICATE OF CORRECTION

| | |
|---|---|
| PATENT NO. | : 11,196,529 B2 |
| APPLICATION NO. | : 16/567543 |
| DATED | : December 7, 2021 |
| INVENTOR(S) | : Wang et al. |

It is certified that error appears in the above-identified patent and that said Letters Patent is hereby corrected as shown below:

In the Claims

Claim 10, Column 18, Line 7-8, "device for the first terminal device" should be --device for the terminal device--.

Claim 10, Column 18, Line 22, "one N BP" should be --one BP--.

Signed and Sealed this
Nineteenth Day of April, 2022

Katherine Kelly Vidal
*Director of the United States Patent and Trademark Office*